(12) United States Patent
Lyons

(10) Patent No.: US 11,723,304 B2
(45) Date of Patent: Aug. 15, 2023

(54) YARD RAKE AND DEBRIS PICKUP DEVICE

(71) Applicant: Barbara Ann Lyons, Redford, MI (US)

(72) Inventor: Barbara Ann Lyons, Redford, MI (US)

( * ) Notice: Subject to any disclaimer, the term of this patent is extended or adjusted under 35 U.S.C. 154(b) by 208 days.

(21) Appl. No.: 17/209,007

(22) Filed: Mar. 22, 2021

(65) Prior Publication Data
US 2021/0386012 A1  Dec. 16, 2021

Related U.S. Application Data

(60) Provisional application No. 63/037,155, filed on Jun. 10, 2020.

(51) Int. Cl.
*A01D 7/04* (2006.01)

(52) U.S. Cl.
CPC ..................... *A01D 7/04* (2013.01)

(58) Field of Classification Search
CPC ............... A01D 7/00–7/10; E01H 1/00–15/00
See application file for complete search history.

(56) References Cited

U.S. PATENT DOCUMENTS

| 2,767,545 | A | * | 10/1956 | Jenkins | A01B 1/12 |
| | | | | | 56/400.06 |
| 2,840,978 | A | * | 7/1958 | Spinosa | A01D 7/02 |
| | | | | | 56/400.04 |
| 4,018,038 | A | * | 4/1977 | Sipe | A01D 7/10 |
| | | | | | 294/50.8 |

(Continued)

FOREIGN PATENT DOCUMENTS

| CA | 2155576 A1 | * | 2/1997 |
| DE | 202020105149 U1 | * | 1/2022 |

(Continued)

*Primary Examiner* — Alicia Torres
*Assistant Examiner* — Madeline I Runco
(74) *Attorney, Agent, or Firm* — Ward Law Office LLC; Jacob M. Ward

(57) ABSTRACT

A device is provided that includes: an elongated handle having a proximal end and a distal end; a handle coupling device attached to the distal end of the elongated handle, the coupling device having a tubular head and a plurality of spaced legs extending distally from the tubular head; a first attachment device pivotally coupled to a distal end of a first leg of the handle coupling device and a second attachment device pivotally coupled to a distal end of a second leg the handle coupling device; and a first set of yard rake tines rotatably coupled to the first attachment device and a second set of yard rake tines rotatably coupled to the second attachment device. The first and second attachment devices are preferably configured pivotally for a user to be able to pivot the first and second attachment device between a first position wherein the first and second attachment device are essentially orthogonal to the elongated handle and at least one other position wherein first and second attachment device are other than orthogonal to the elongated handle. The first and second sets of yard rake tines are preferably configured rotatably for a user to be able to rotate the first and second yard rake tines between a first position wherein the tines extend outwardly to perform as a rake and at least one other position wherein the first and second yard rake tines extend outwardly in opposite directions to perform as a grabbing device.

16 Claims, 18 Drawing Sheets

(56) References Cited

U.S. PATENT DOCUMENTS

| | | | | |
|---|---|---|---|---|
| 5,133,177 | A * | 7/1992 | Miller | A01D 7/04 56/400.18 |
| 5,414,982 | A * | 5/1995 | Darnell | A01D 7/04 294/111 |
| 5,720,159 | A * | 2/1998 | Dee | A01D 7/06 56/400.18 |
| 6,101,799 | A * | 8/2000 | Darnell | A01D 7/10 56/400.01 |
| 6,283,521 | B1 * | 9/2001 | Agrati | A01D 7/04 294/111 |
| 6,336,314 | B1 * | 1/2002 | Crevier | A01D 7/10 294/50.8 |
| 6,339,919 | B1 * | 1/2002 | Hsu | A01D 7/04 56/400.17 |
| 9,282,694 | B2 * | 3/2016 | Urrutia | A01D 7/04 |
| 2002/0174641 | A1 * | 11/2002 | Biggs | A01D 7/06 56/400.12 |
| 2015/0296705 | A1 * | 10/2015 | Urrutia | A01D 7/10 56/400.12 |
| 2018/0020612 | A1 * | 1/2018 | Alexander | A01D 7/10 56/400.12 |

FOREIGN PATENT DOCUMENTS

| | | | | |
|---|---|---|---|---|
| GB | 2402359 A | * | 12/2004 | A01B 1/00 |
| WO | WO-02102137 A1 | * | 12/2002 | A01D 7/10 |
| WO | WO-2011116789 A1 | * | 9/2011 | A01D 7/10 |

* cited by examiner

YARD RAKE AND DEBRIS PICKUP DEVICE

BACKGROUND

This application relates in general to yard tools, and more particularly an all-in-one yard rake and debris pickup device.

Gardeners have used yard rakes for generations to remove grass, leaves, and other debris from their yards. Yard rakes allow gardeners to gather material to be removed from about a property to a central location of removal. Once the material is moved to a central pile, the material must be lifted to be placed into a trash bag, refuse can, or wheelbarrow for disposal. It is not efficient or comfortable for a gardener to bend over and use his/her hands to pick up the debris. Some gardeners attempt to use garden rakes to "scoop up" the material for disposal. This approach is typically ineffective as much of the waste material will fall off the yard rake tines. Gardeners may attempt to use one hand to hold the material onto the rake tines while holding the rake handle in the other hand, but this too suffers from the same problems associated with the gardener using his/her hands to pick up the debris. None of these approaches provide a safe and efficient mechanism to first rake up yard waste material and then pick it up for disposal.

A need therefore exists for a single device that assists in gathering yard waste/debris from a property area that is not so limited. In this regard, the present application provides a yard tool that addresses the existing limitations in the way yard rakes and related hand tools are used.

SUMMARY

The present application solves the above and other problems by providing an article of manufacture for an all-in-one yard rake and debris pickup device.

In one aspect, a device is provided that includes: an elongated handle having a proximal end and a distal end; a handle coupling device attached to the distal end of the elongated handle, the coupling device having a tubular head and a plurality of spaced legs extending distally from the tubular head; a first attachment device pivotally coupled to a distal end of a first leg of the handle coupling device and a second attachment device pivotally coupled to a distal end of a second leg the handle coupling device, wherein the first and second attachment devices are configured for a user to be able to pivot the first and second attachment device between a first position wherein the first and second attachment device are essentially orthogonal to the elongated handle and at least one other position wherein the first and second attachment device are other than orthogonal to the elongated handle; and a first set of yard rake tines rotatably coupled to the first attachment device and a second set of yard rake tines rotatably coupled to the second attachment device, wherein the first and second sets of yard rake tines are configured for a user to be able to rotate the first and second yard rake tines between a first position wherein the tines extend outwardly to perform as a rake and at least one other position wherein the first and second yard rake tines extend outwardly in opposite directions to perform as a grabbing device.

In one embodiment, the first and second sets of yard rake tines rotate between the first position and the at least one other position in essentially the same plane.

In one embodiment, in the at least one other position, the first and second attachment devices are in a plane essentially parallel to an axis of the elongated handle.

In one embodiment, the first and second attachment devices have a generally planer structure that are essentially in the same planes as the first and second set of tines.

In one embodiment, the device includes a support device pivotally coupled to the first and second attachment devices therewith forming a dual axis hinge between the first and second attachment devices.

In one embodiment, the axes of the hinge are in a same or a parallel plane as the first and second attachment devices, and wherein the axes of the hinge in the first position of the first and second attachment device are essentially orthogonal to the elongated handle and in the at least one other position the first and second attachment device the axes are other than orthogonal to the elongated handle.

In one embodiment, the first and second attachment devices are coupled along their respective proximal edges to the hinged support device.

In one embodiment, the device includes interlocking engagement elements for locking the first and second attachment device in the first position wherein the tines extend outwardly to perform as a rake.

In one embodiment, the device includes a first control handle pivotally coupled to the elongated handle, a first control line having a proximal end coupled to the first control handle and a distal end coupled to at least one of the first and second attachment devices, the device configured therewith to cause the first and second attachment devices to fold by pulling the first control line via the first control handle.

In one embodiment, the device includes a support device with a slot therein pivotally coupled to the first and second attachment devices therewith forming a dual axis hinge between the first and second attachment devices, the first control line coupled at its distal end to the slot in the support device.

In one embodiment, the first control line passes through a conduit provided by the tubular head.

In one embodiment, the device includes comprising a second control handle pivotally coupled to the elongated handle, a second control line having a proximal end coupled to the first control handle and a distal end coupled to at least one of the first and second set of tines, the device configured therewith to cause at least one of the first and second set of yard rake tines to rotate relative to at least one of the first and second attachment devices by pulling the second control line via the second control handle.

In one embodiment, the second control line pass through a plurality of slots in the first and second attachment devices.

In one embodiment, at least one of the first and second attachment devices comprise a circular flanged structure that forms a circular slot for receiving a correspondingly shaped structure on at least one of the first and second sets of yard rake tines.

In one embodiment, the device includes a second control handle pivotally coupled to the elongated handle, a second control line having a proximal end coupled to the first control handle and a distal end coupled to at least one of the first and second set of tines, the device configured therewith to cause at least one of the first and second set of yard rake tines to rotate relative to at least one of the first and second attachment devices by pulling the second control line via the second control handle.

In one embodiment, the second control line pass through a plurality of slots in the first and second attachment devices.

The foregoing has outlined rather broadly the features and technical advantages of the apparatus disclosed herein in order that the detailed description of the invention that follows may be better understood. Additional features and advantages of the device will be described hereinafter that form the subject of the claims herein. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the device, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

Additional aspects of the present invention will be apparent in view of the description which follows.

DETAILED DESCRIPTION

Figure 1:
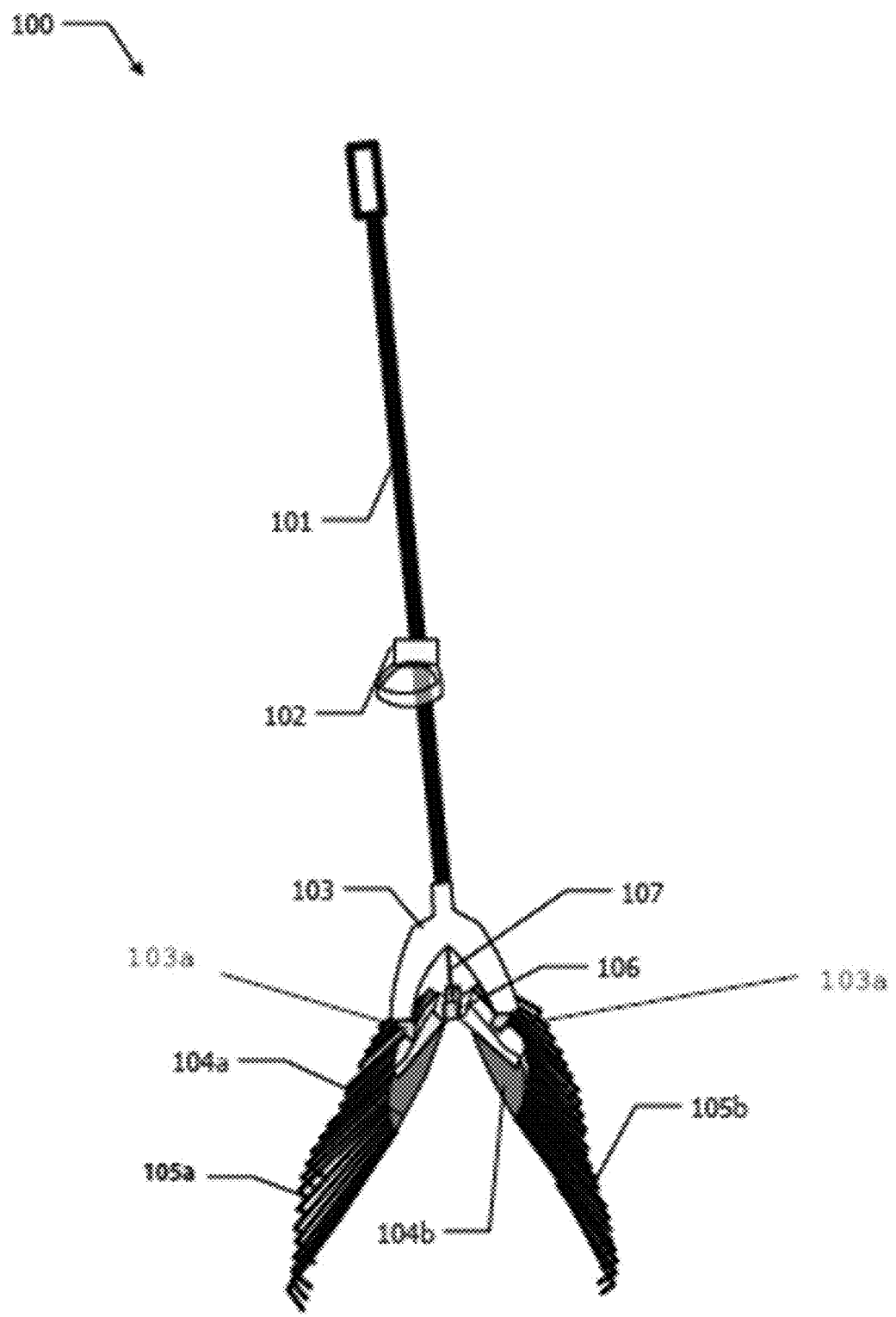
FIG. 1 illustrates a yard rake and debris pickup device according to at least one embodiment of the devices disclosed herein.

This application relates in general to an all-in-one, yard rake and debris pickup device.

Embodiments of the device will be described in detail with reference to the drawings, wherein like reference numerals represent like parts and assemblies throughout the several views. Reference to these embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill. Further, unless otherwise stated, the term "about" shall expressly include "exactly."

The term "user" and "gardener" refers to an entity, e.g. a human, who operates a device according to the present invention in order to bring about a desired effect or outcome. For such a user, the terms user and gardener may be used herein interchangeably.

Figure 2:
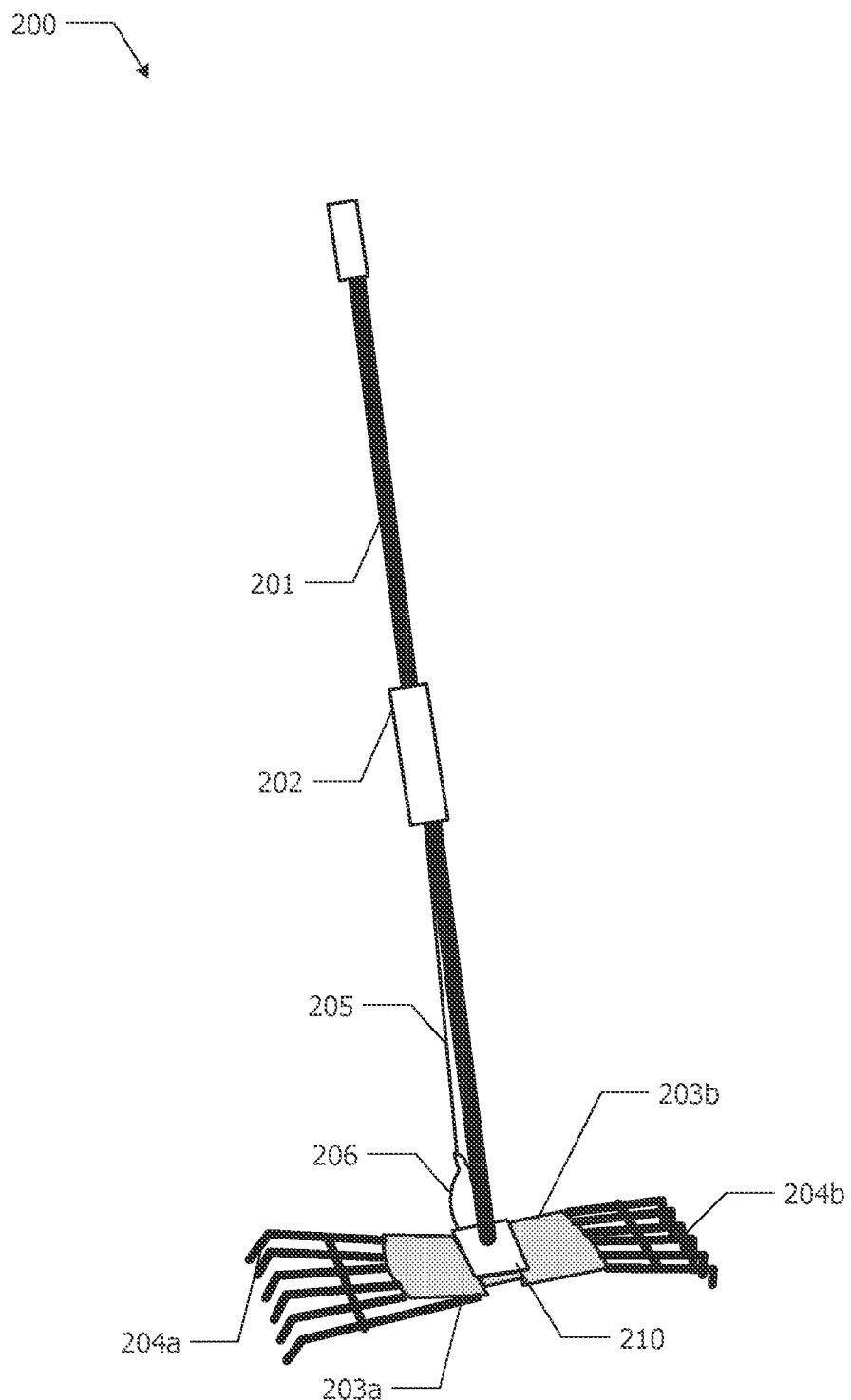
FIG. 2 illustrates a yard rake and debris pickup device according to at least one embodiment of the devices disclosed herein.

In general, the present disclosure relates to an all-in-one yard rake and debris pickup device. To better understand the present invention, FIG. 1 illustrates one potential embodiment for an all-in-one yard rake and debris pickup device. The device 100 generally includes a pair, e.g., a first set and a second set of yard rake tines 105a-b coupled to each other via a hinged support device 106 that allows the pair to fold as shown. The pair of yard rake tines 105a-b are configured, at least for picking up debris, to a first, open position by default in which the pair of yard rake tines 105a-b are located on a common plane that may correspond to the ground, as shown in FIG. 2.

Each of the pair of yard rake tines 105a-b is coupled to a corresponding hinged attachment device 104a-b. The attachment devices 104a-b are coupled along their respective proximal, inner edges to the hinged support device 106. The hinged support device 106 permits the pair of hinged attachment devices 104a-b and the corresponding pair of yard rake tines 105a-b to pivot inward (fold) about a pivot point along one or more hinge axes provided by the hinged support device 106. The pivot point is located between the pair of hinged attachment devices 104a-b, causing the distal, outer edges of the pair of yard rake tines 105a-b to be pulled together into a closed position as the assembly folds, as shown in FIG. 1. When the pair of yard rake tines 105a-b is in the closed position, the pair of yard rake tines 105a-b acts as a grabbing device that may capture yard debris in between the two sets of tines.

The pair of attachment devices 104a-b also is pivotally coupled about a pair of attachment points in the center of each attachment device 104a-b to a pair of opposing handle attachment points 103a on a handle coupling device 103 (fork). The pair of attachment points 103a includes a hinge between the handle coupling device 103 and is attached to a distal, bottom end of a long handle 101 to the all-in-one device at a point equally spaced between the pair of opposing handle attachment points.

A control line 107 extends down along the long handle 101 and through a conduit in the handle coupling device 103. The control line 107 is attached to the hinged support device 106 at about the pivot point. The control line 107 possesses an upper end that is attached to a control handle 102 that is typically located about the middle of the long handle 101. The control handle 102 is pivotally coupled to the handle 101, which may be pulled upward by a user in order to retract the control line 107 and correspondingly to move the hinged support device 106 proximally and for the pair of yard rake tines 105a-b to pivot about handle attachment points 103a from the default open position to the closed position. When the control handle 102 is pulled upward, the control handle pulls the control line 107 upward as well. The hinged support device 106 also is pulled upward and causes the pair of yard rake tines 105a-b to move toward each other as the pair of hinged attachment points 104a-b rotates when the hinged support device 106 moves.

A gardener may use the all-in-one yard rake and debris pickup device as a rake when the pair of yard rake tines 105a-b are located in the default open position. The gardener may pull up on the control handle 102 to grab raked yard debris for placement into a trash bag, refuse can or wheelbarrow for disposal. Release of the control handle 102 returns the pair of yard rake tines 105a-b to the default open position and releases any debris between the tines.

FIG. 2 illustrates another embodiment of an all-in-one yard rake and debris pickup device. The all-in-one device 200 comprises a pair of yard rake tines 204a-b coupled to a pair of pivoting support devices 203a-b. The pair of yard rake tines 204-b is configured to an open position by default in which the pair of yard rake tines 204ab are located on a common plane that may correspond to the ground.

Each pivoting support device 203a-b is coupled to an opposing edge of a central hinged attachment device 210. The central hinged support device 210 permits the pair of pivoting support devices 203a-b, and the corresponding pair of yard rake tines 204a-b to pivot inward about a pivot point along the corresponding edges of the central hinged support device 210. The pair of pivot points along the corresponding edges of the central hinged support device 210 causes the outer edges of the pair of yard rake tines 204-b to be pulled together into a closed position. When the pair of yard rake tines 204a-b are in the closed position, the tines 204a-b act as a grabbing device that may capture yard debris in between the pair of yard rake tines.

A bottom end of a long handle 201 to an all-in-one yard rake and debris pickup device 200 is coupled to the central hinged support device 210 at a point in the center of a top surface.

A control line 205 extends down the long handle 210 and is attached to the hinged drive device 206 about the pivot point. The control line 205 possesses an upper end that is attached to a control handle 202 that is typically located about the middle of the long handle 201. The control handle 202 may be pulled upward by a user in order to move the pair of yard rake tines 204-b from the default open position to the closed position.

When the control handle 202 is pulled upward, the control handle pulls the control line 205 upward as well. The hinged drive device 206 also is pulled upward and causes the pair of yard rake tines 205-b to move toward each other as the pair of pivoting support device 203a-b rotate about their respective edges of the central hinged support device 210.

A gardener may use the all-in-one yard rake and debris pickup device as a rake when the pair of yard rake tines 204-b are located in the open position. The gardener may pull up on the control handle 202 to grab raked yard debris for placement into a trash bag, refuse can or wheelbarrow for disposal. Release of the control handle 202 returns the pair of yard rake tines 204-b to the default open position and releases any debris between the tines.

Figure 3A:
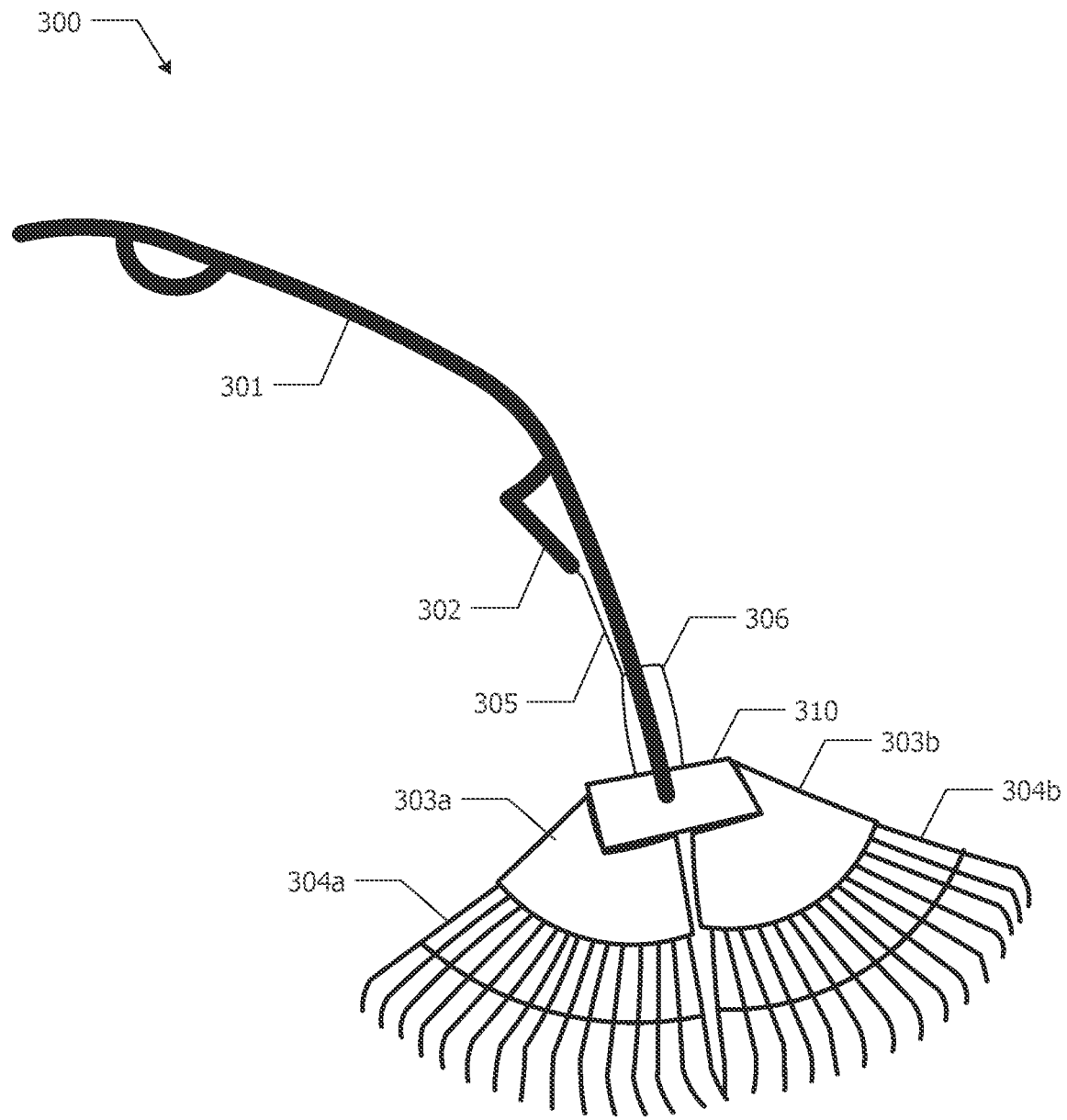
FIGS. 3a-c illustrate a yard rake and debris pickup device according at least one embodiment of the devices disclosed herein.
Figure 3B:
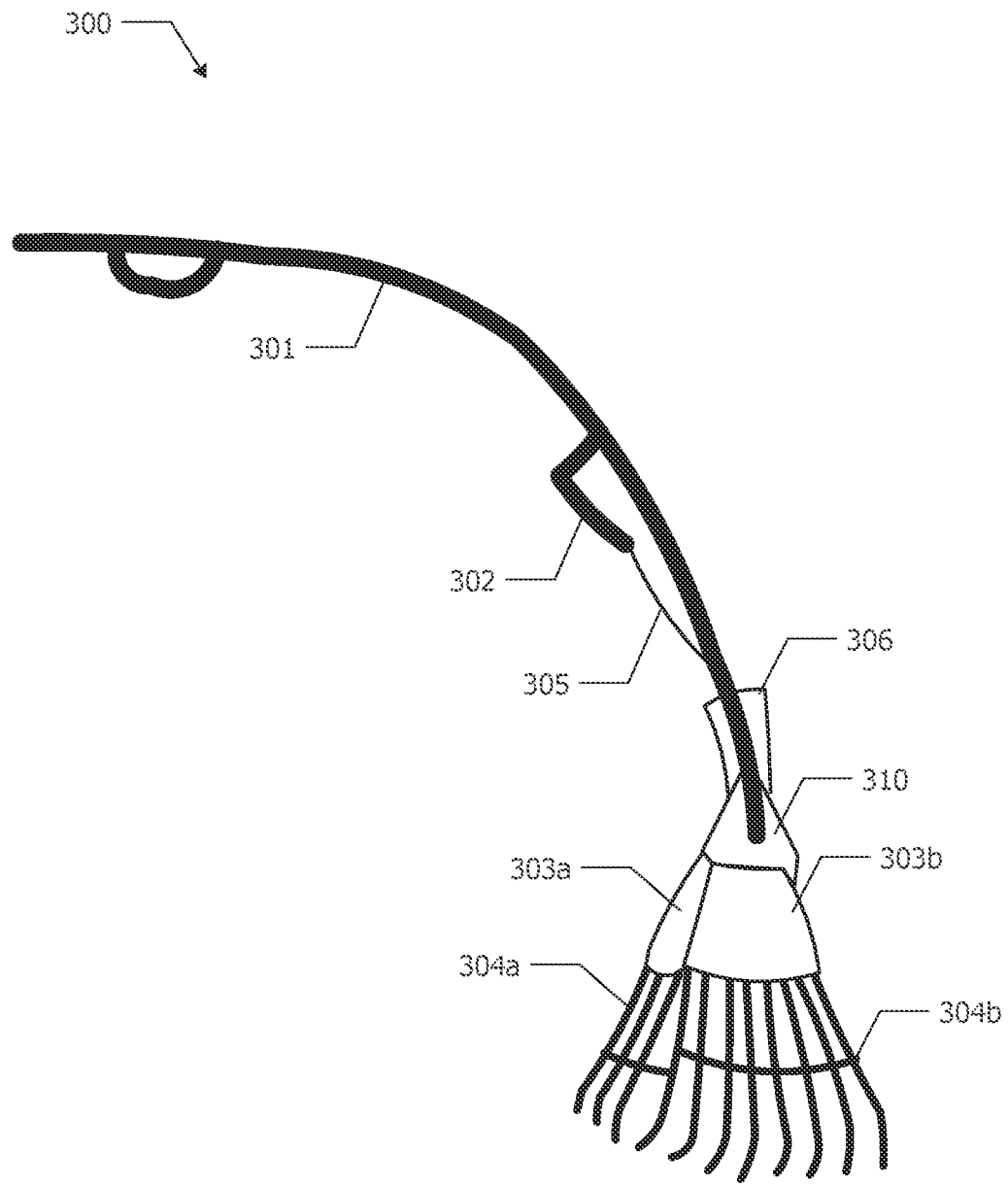
Figure 3C:
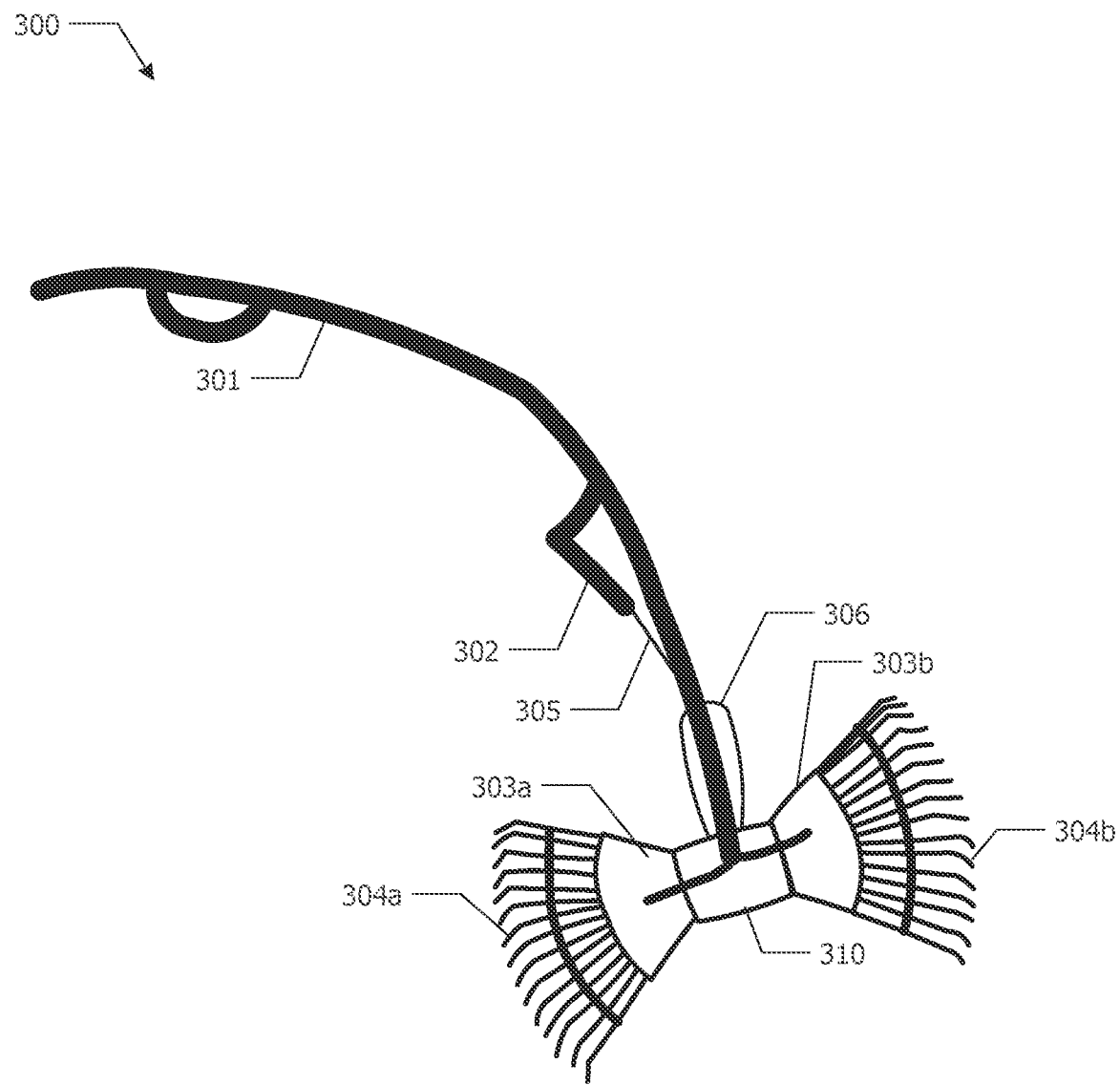

FIG. 3a-c illustrate another embodiment of an all-in-one yard rake and debris pickup device according to the present invention. FIG. 3a shows the all-in-one yard rake and debris pickup device in a spread rake position. FIG. 3b shows the all-in-one yard rake and debris pickup device in a closed position. FIG. 3c shows the all-in-one yard rake and debris pickup device in an open rake position.

The all-in-one device 300 comprises a pair of yard rake tines 304a-b coupled to a pair of pivoting support devices 303a-b. The pair of yard rake tines 304-b is configured to an open rake position by default in which the pair of yard rake tines 304a-b are located on a common plane that may correspond to the ground.

Each pivoting support device 303a-b is coupled to an opposing edge of a central hinged attachment device 310. The central hinged support device 310 permits the pair of pivoting support devices 303a-b, and the corresponding pair of yard rake tines 304a-b, to pivot inward about a pivot point along the corresponding edges of the central hinged support device 310. The pair of pivot points along the corresponding edges of the central hinged support device 310 causes the outer edges of the pair of yard rake tines 304-b to be pulled together into a closed position (fold), that is, the spread rake position. When the pair of yard rake tines 304a-b are in the closed position, the tines 304a-b act as a grabbing device that may capture yard debris in between the pair of yard rake tines, as discussed above.

A bottom end of a long handle 301 to an all-in-one yard rake and debris pickup device 300 is coupled to the central hinged support device 310 at a point in the center of a top surface.

A control line 305 extends down the long handle 310 and is attached to the hinged drive device 306 about the pivot point. The control line 305 possesses an upper end that is attached to a control handle 302 that is typically located about the middle of the long handle 301. The control handle 302 may be pulled upward by a user in order to move the pair of yard rake tines 304-b from the default open position to the closed position.

When the control handle 302 is pulled upward, the control handle pulls the control line 305 upward as well. The hinged drive device 306 also is pulled upward and causes the pair of yard rake tines 305-b to move toward each other as the pair of pivoting support device 303a-b rotate about their respective edges of the central hinged support device 310.

FIGS. 4a-d illustrate one embodiment for an all-in-one yard rake and debris pickup device. The device 400 generally includes a first set and a second set of yard rake tines 405a-b hingedly and rotatably coupled to each other. More specifically, each of the set of tines 405a-b is rotatably coupled to attachment devices 404a-b, which in turn are hingedly coupled to support device 406. As can be seen, the tines 405a-b extend outwardly in a plane that is essentially parallel to the axis of the handle 401. The attachment devices 404a-b may generally be planer structures that are preferably essentially in the same plane as that of the tines 405*a*-*b*. Thus, the rotation of the tines 405*a*-*b* relative to attachment devices 404*a*-*b* occurs in the same or a parallel place, as shown between FIGS. 4*b* and 4*c*.

Figure 4A:
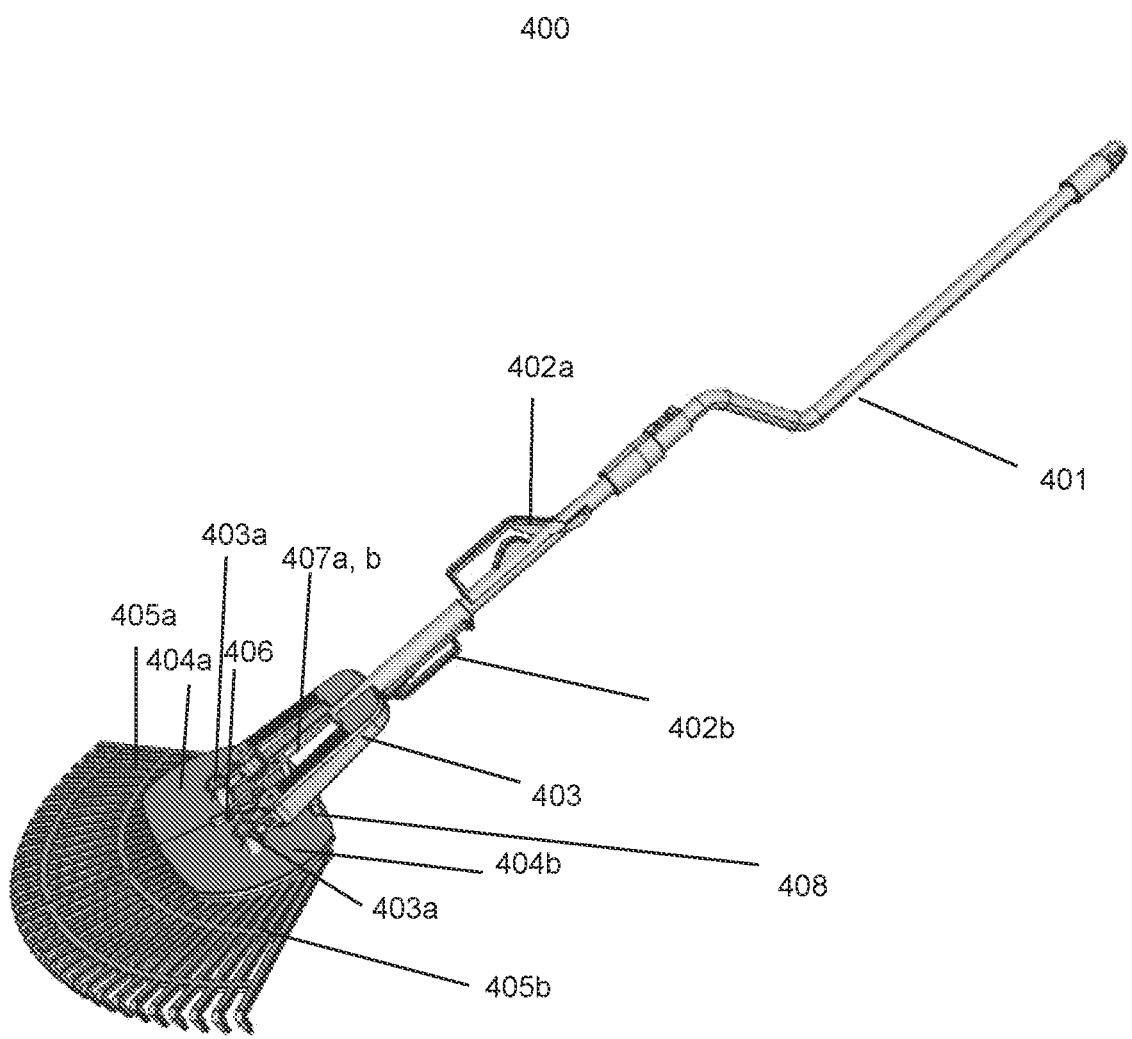
FIGS. 4a-d illustrate a yard rake and debris pickup device according at least one embodiment of the devices disclosed herein.
Figure 4B:
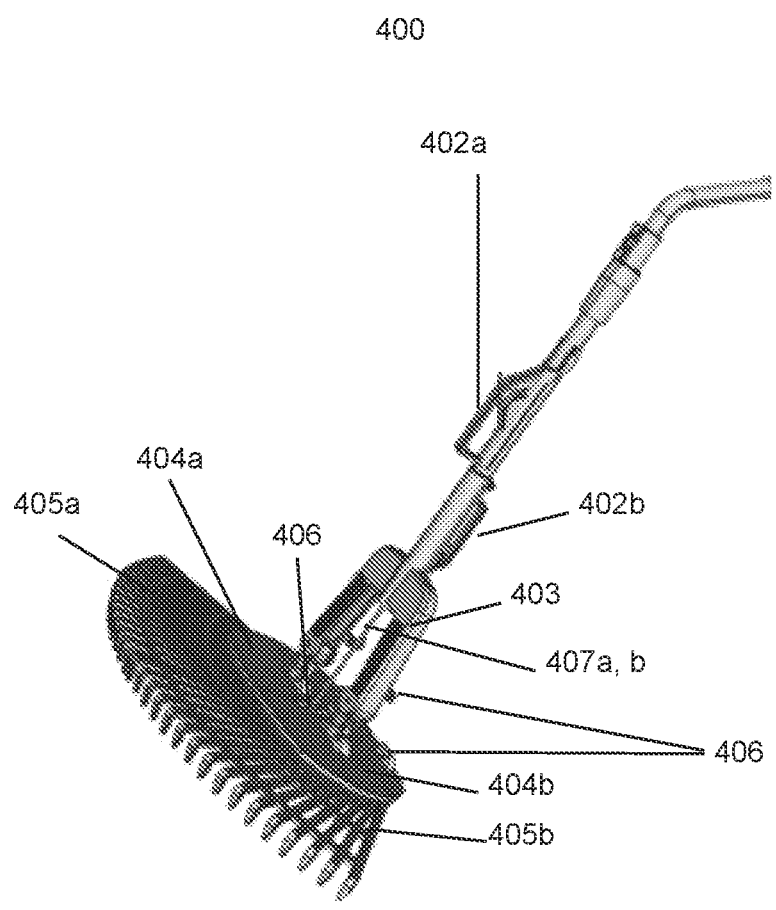
Figure 4C:
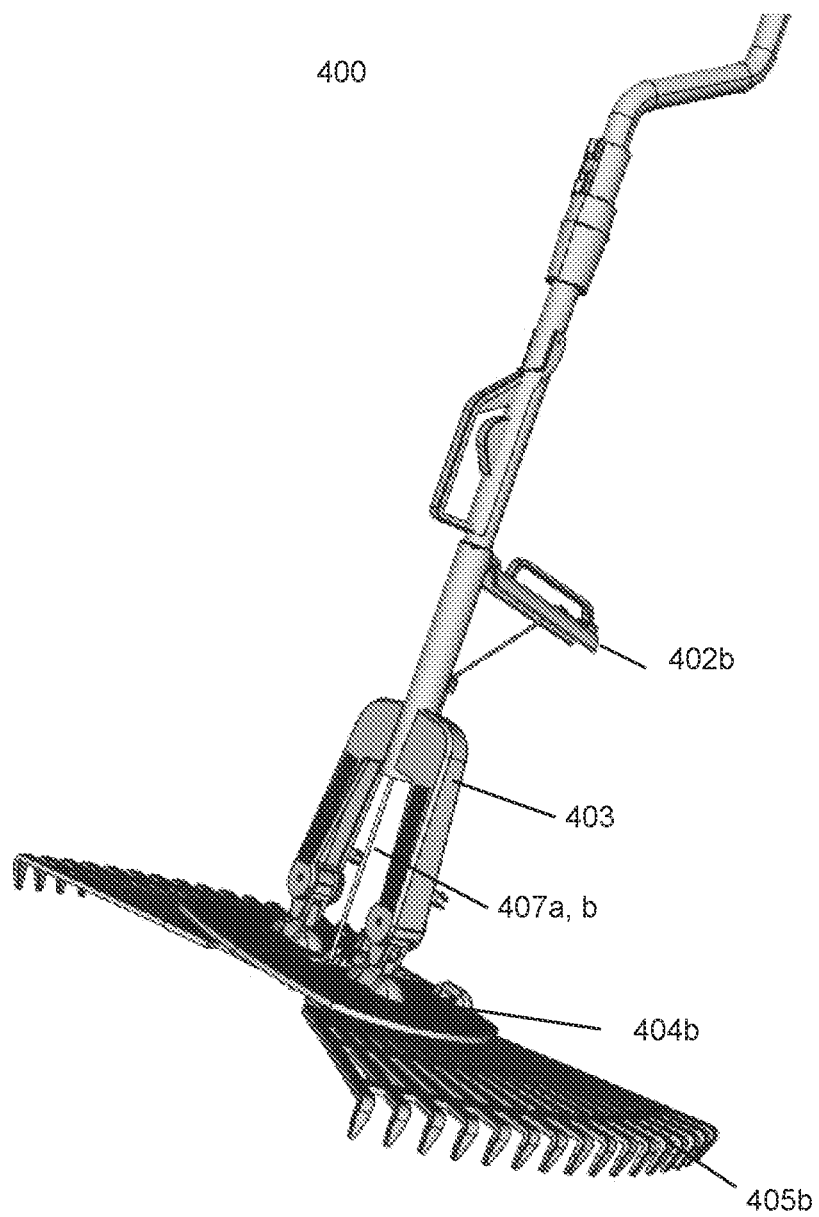
Figure 4D:
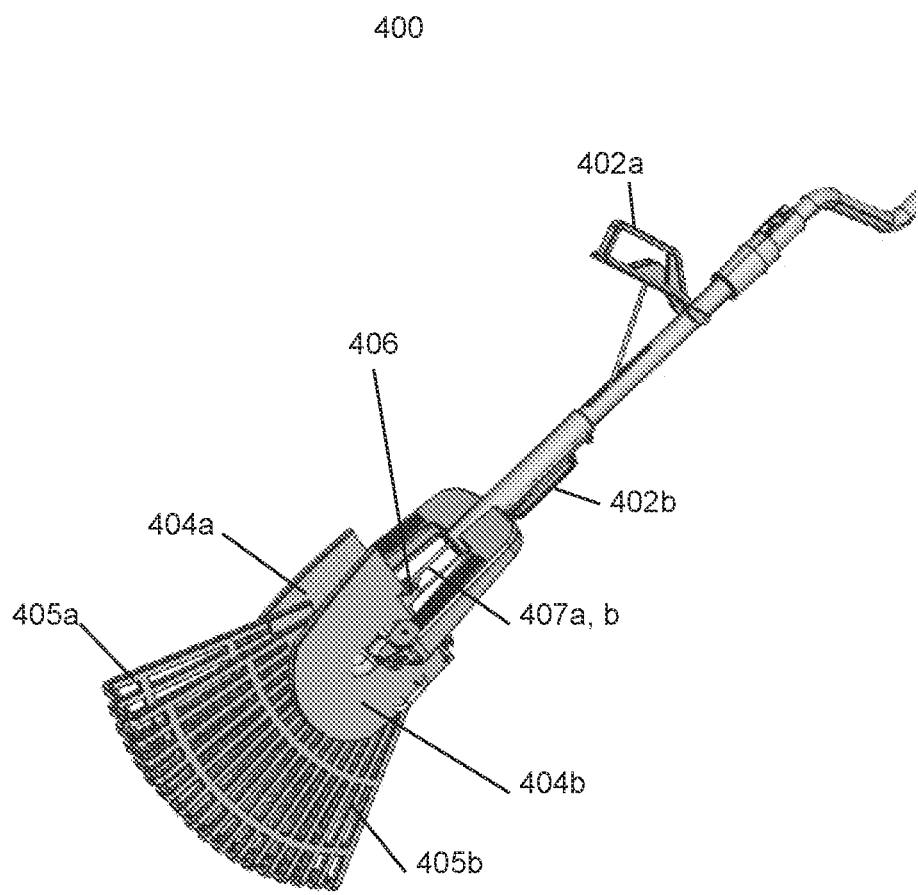

The attachment devices 404*a*-*b* are hingedly coupled to each other via support device 406, which allows the attachment devices 404*a*-*b* to fold essentially in half, as shown in FIGS. 4*c* and 4*d*. In this instance, the axis of the fold about the support device 406 is essentially inline with the axis of the handle 401 when in the rake position shown in FIG. 4*a*. The attachment devices 404*a*-*b* are further hingedly coupled to the support device 406 via opposing handle attachment points 403*a*. The axis about which attachment points 403*a* pivot is essentially perpendicular to the support device 406 axis. The pair of yard rake tines 405*a*-*b* are rotated relative to the attachment devices 404*a*-*b* to point distally and the attachment devices 404*a*-*b* are arranged to be in the same plane as each other and in the same plane or essentially parallel to the axis of the handle 401. This position may be locked be interlocking engagement elements 408. In the rake position, the user may use the device 400 as a rake to gather debris to one or more locations. Thereafter, the user may configure the device 400 for picking up debris. This may be accomplished by releasing the attachment devices 404*a*-*b* from the handle coupling device 403 and pivoting the attachment devices 404*a*-*b* relative to the handle coupling device 403 so that these components are essentially orthogonal to each other, as shown in FIG. 4*b*, and ready to be used as a grabbing device as discussed herein.

Each of the pair of yard rake tines 405*a*-*b* is rotatably coupled to a corresponding hinged attachment device 404*a*-*b*. The attachment devices 404*a*-*b* are coupled along their respective proximal, inner edges to the hinged support device 406. The hinged support device 406 permits the pair of hinged attachment devices 404*a*-*b* and the corresponding pair of yard rake tines 405*a*-*b* to pivot inward about a pivot point along one or more hinge axes provided by the hinged support device 406. The pivot point is located between the pair of hinged attachment devices 404*a*-*b*, causing the distal, outer edges of the pair of yard rake tines 405*a*-*b* to be pulled together into a closed position, as shown in FIGS. 4*c*-*d*. When the pair of yard rake tines 405*a*-*b* is in the closed position, the pair of yard rake tines 405*a*-*b* act as a grabbing device that may capture yard debris in between the two sets of tines.

The pair of attachment devices 404*a*-*b* is also pivotally coupled about a pair of attachment points approximately in the center at the top surfaces of each attachment device 404*a*-*b* to a pair of opposing handle attachment points 403*a* on the handle coupling device 403. The handle coupling device is preferably fork shaped to provide clearance for the attachment devices 404*a*-*b*, as shown in FIG. 4*d*. The pair of attachment points 403*a* includes a hinge between the handle coupling device 403 and is attached to a distal, bottom end of a handle 401 to the all-in-one device at a point equally spaced between the pair of opposing handle attachment points.

In this embodiment, one or a plurality of control lines 407*a*-*b* are provided which each extends downward along the long handle 401 and through a conduit in the handle coupling device 403. A first control line 407*a* is attached to the hinged support device 406 at about the pivot point thereof. The control line 407*a* possesses an upper or proximal end that is attached to a first control handle 402*a* that is typically located about the middle of the long handle 401. The control handle 402*a* is pivotally coupled to the elongated handle 401, which may be pulled upward by a user in order to retract the control line 407*a* and correspondingly to move the hinged support device 406 proximally and for the pair of yard rake tines 405*a*-*b* to pivot about handle attachment points 403*a* from the open position (FIG. 4*c*) to the closed position (FIG. 4*d*). When the control handle 402*a* is pulled upward, the control handle pulls the control line 407*a* upward as well. The hinged support device 406 also is pulled upward and causes the pair of yard rake tines 405*a*-*b* to pivot toward each other (fold) as the pair of hinged attachment points 404*a*-*b* rotate as the hinged support device 106 is pulled proximally.

Figure 5A:
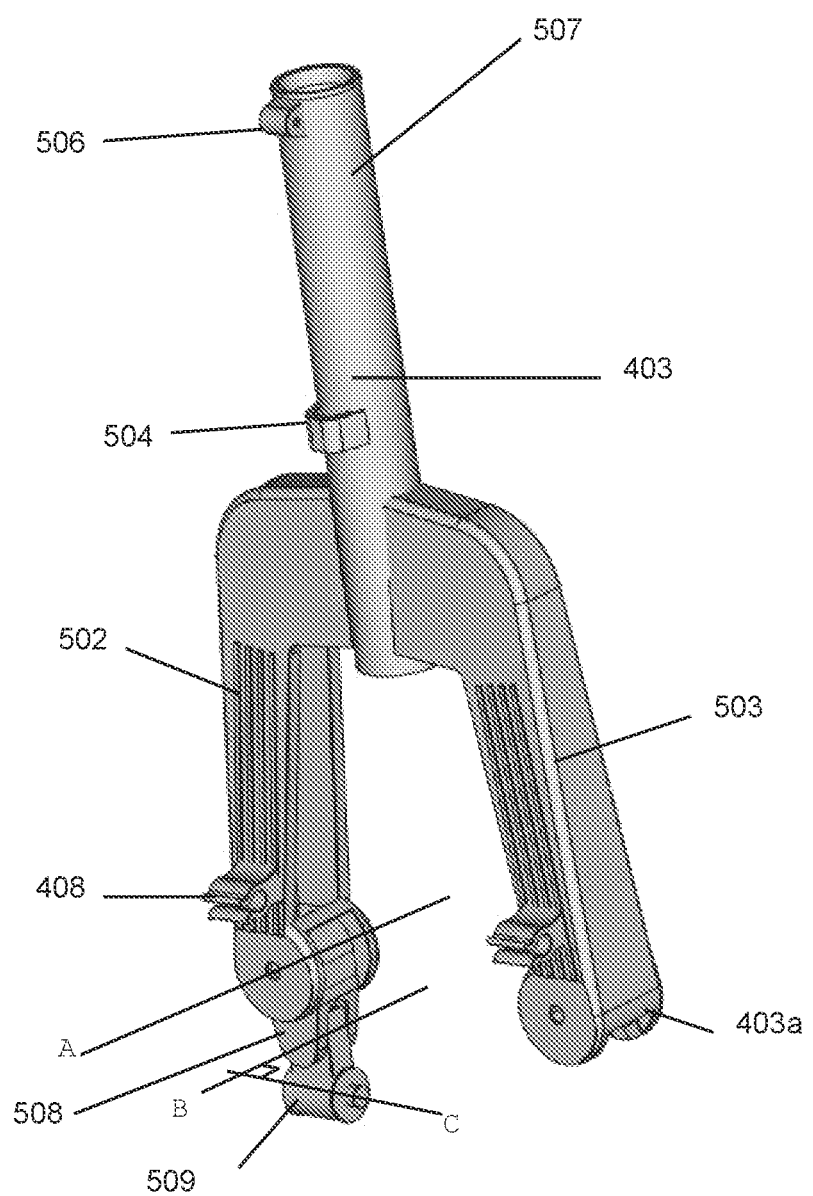
FIGS. 5a-5i illustrate components of a yard rake and debris pickup device according at least one embodiment of the devices disclosed herein.
Figure 5B:
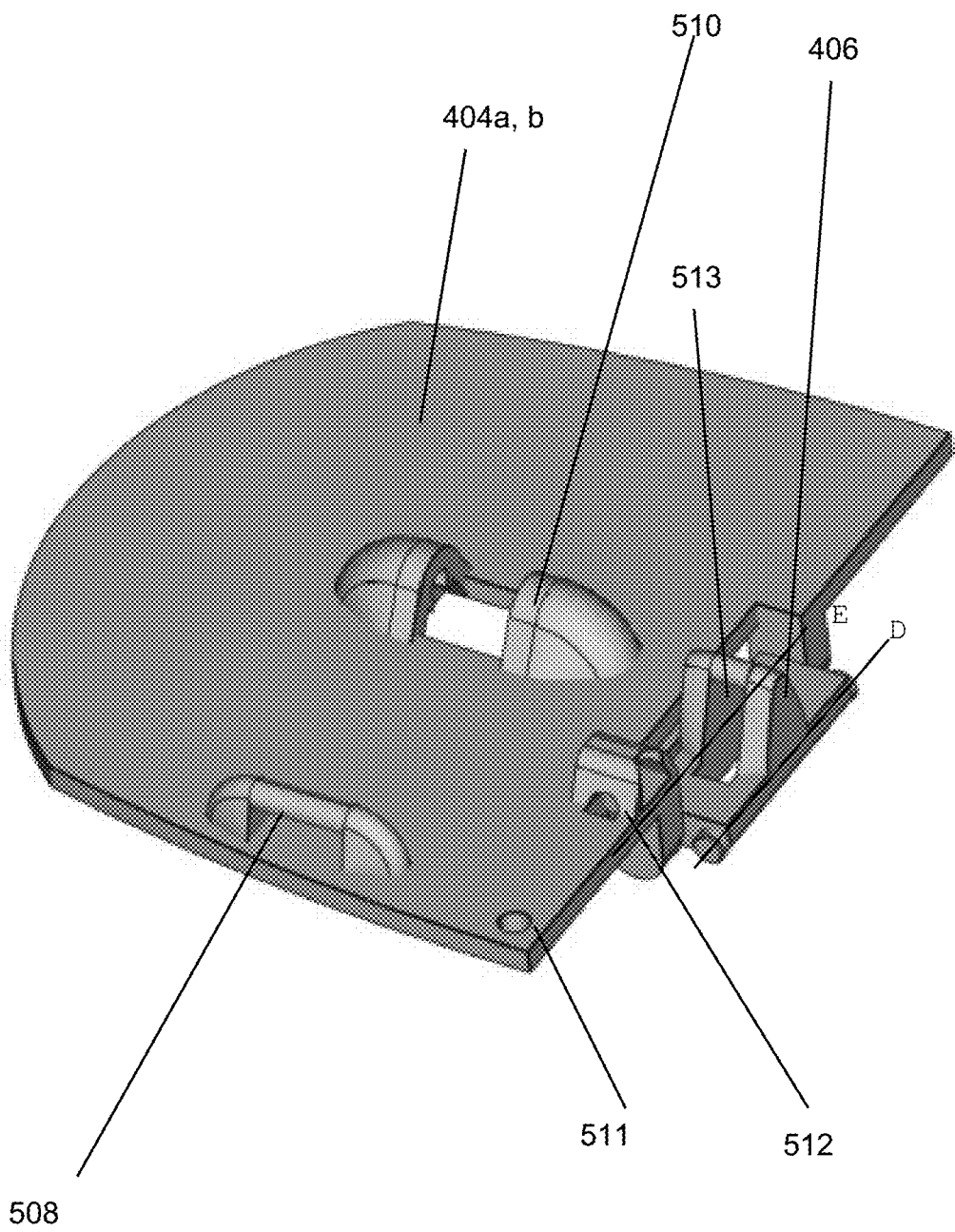
Figure 5C:
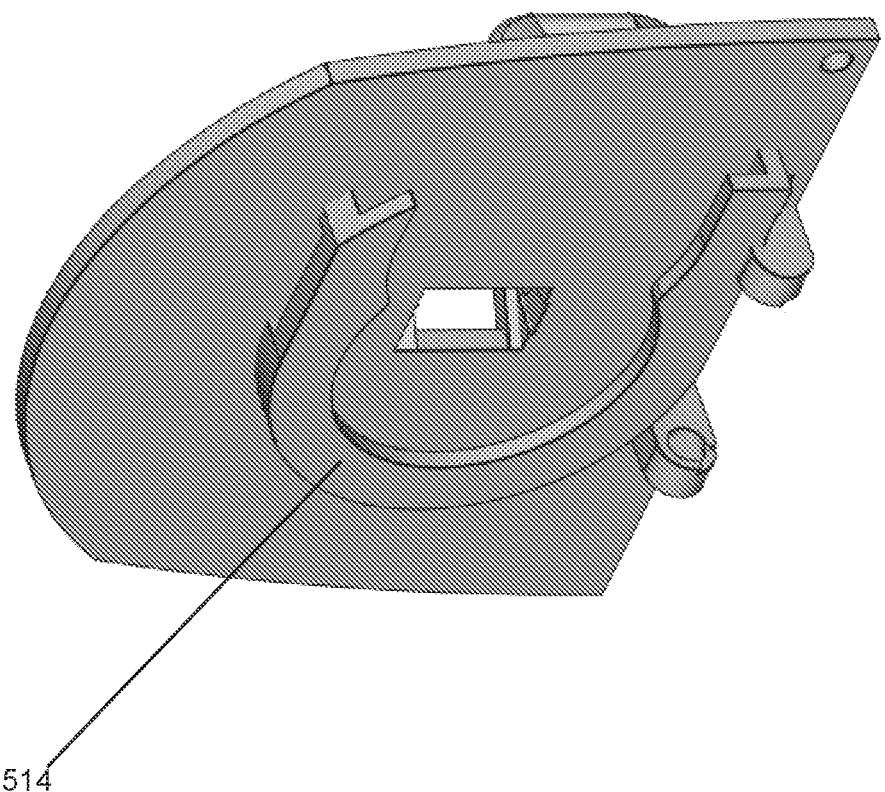
Figure 5D:
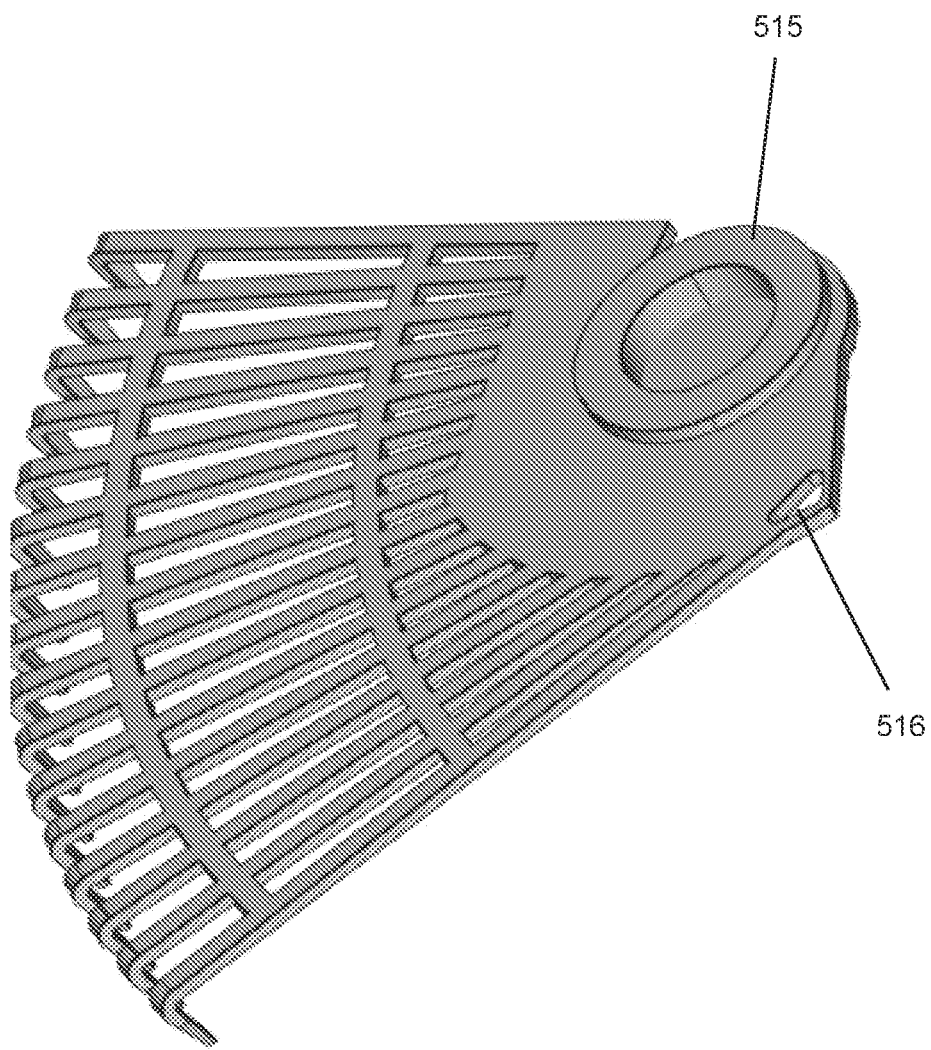
Figure 5E:
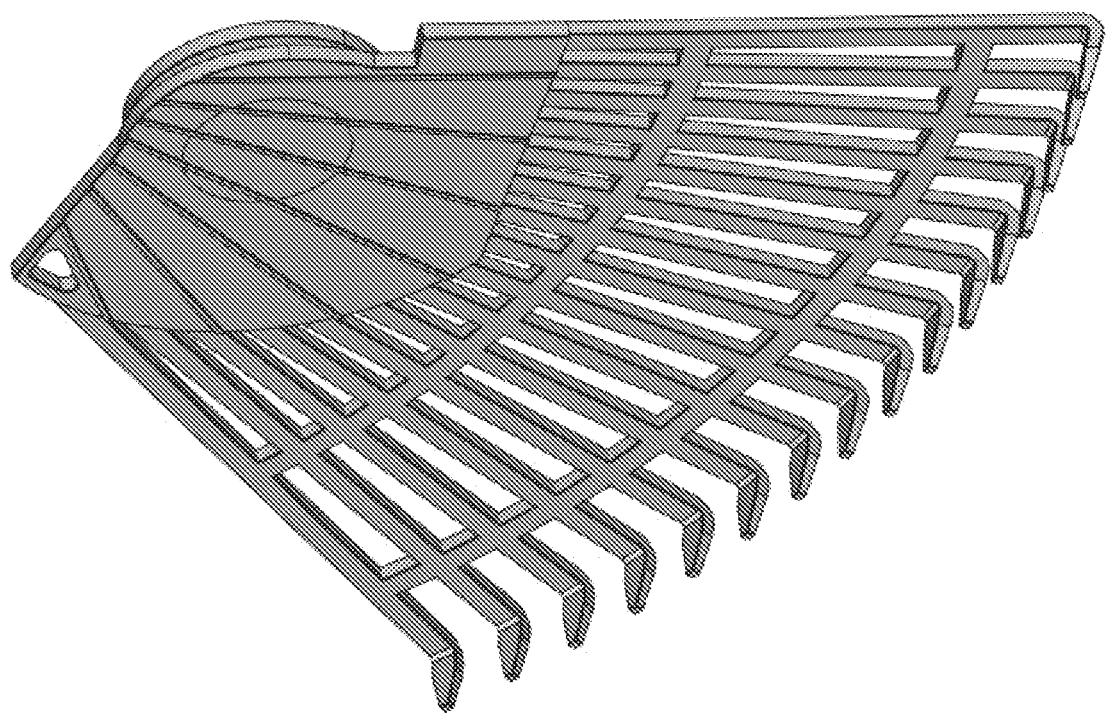
Figure 5F:
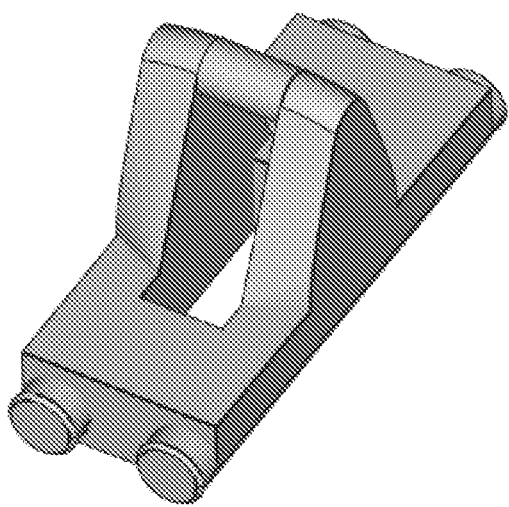
Figure 5G:
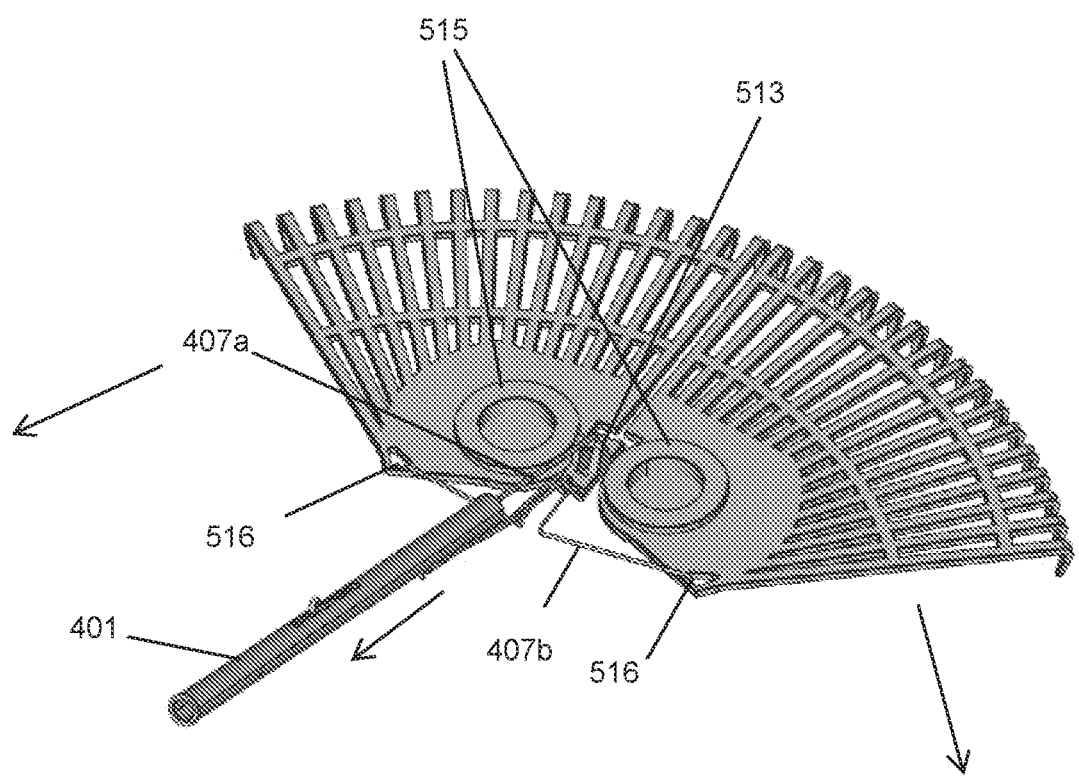
Figure 5H:
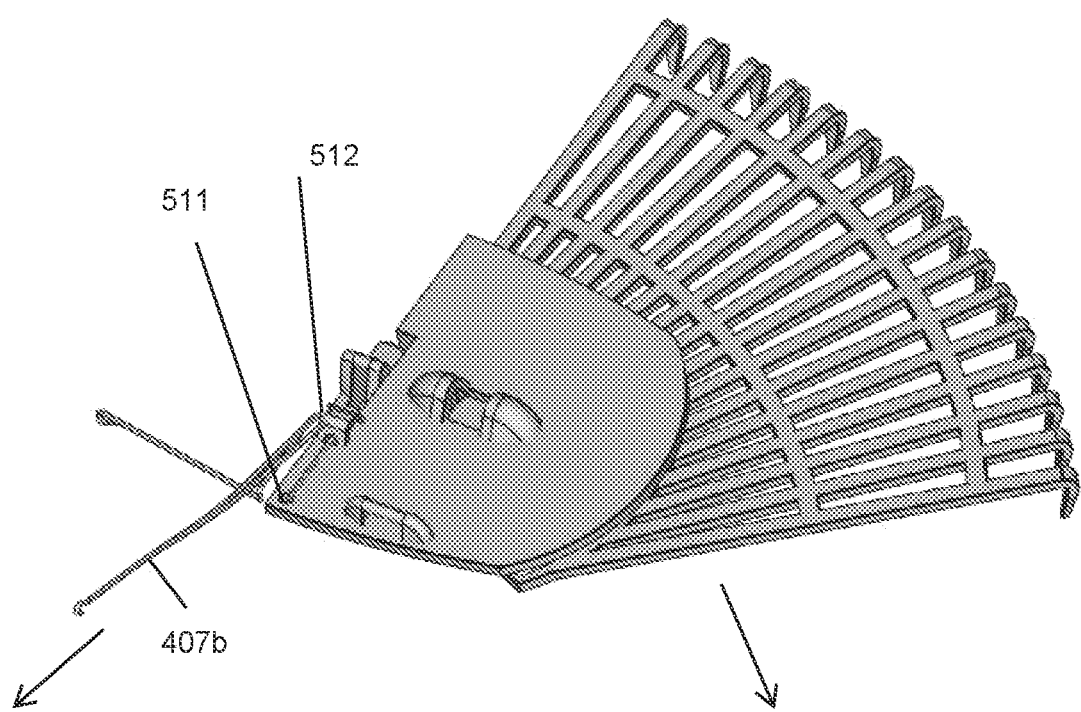
Figure 5I:
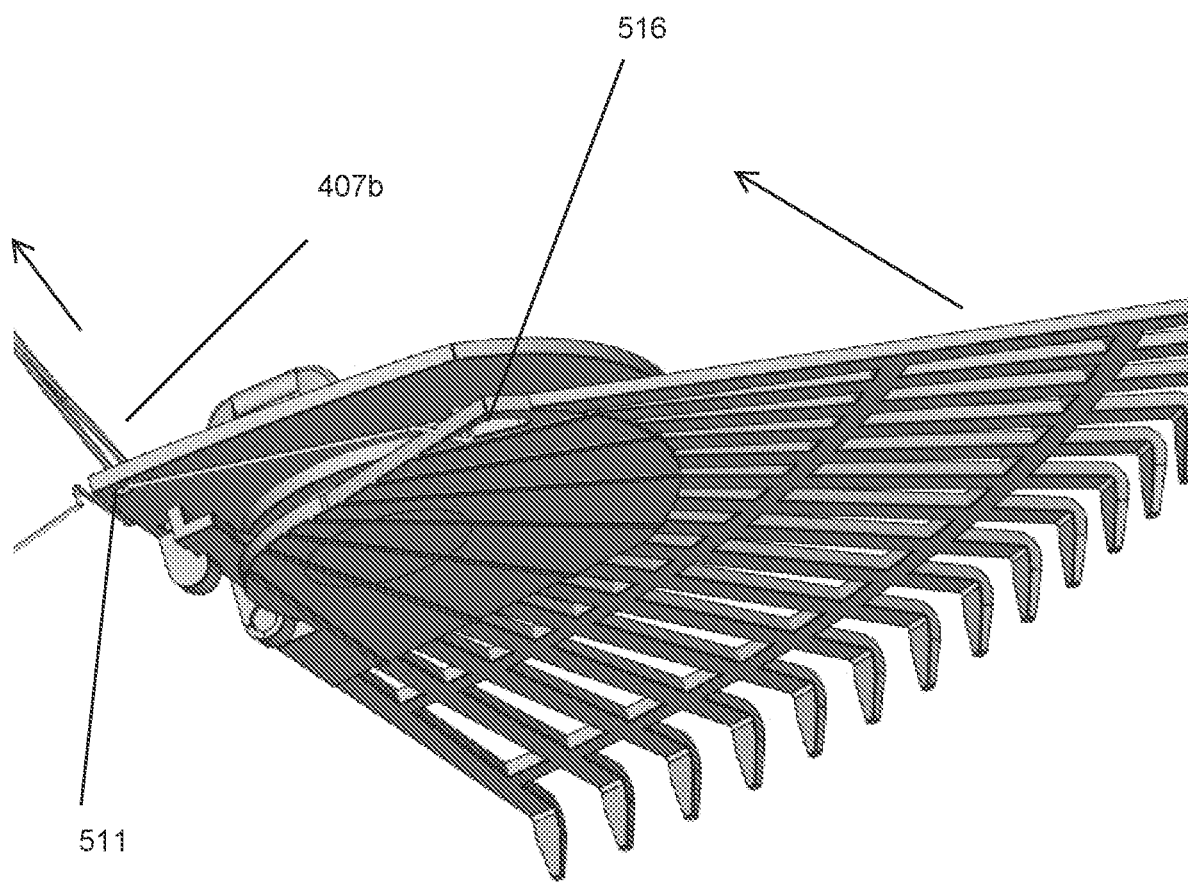

A second control line 407*b* is attached to the yard rake tines 405*a*-*b* via hinged attachment devices 404*a*-*b*, as shown in FIG. 5*g*-5*i*. The control line 407*b* possesses an upper end that is attached to a second control handle 402*b* that is typically located distally on the long handle 401. The control handle 402*b* is pivotally coupled to the handle 401, which may be pulled upward by a user in order to retract the control line 407*b* and correspondingly to rotate yard rake tines 405*a*-*b*, as shown in FIGS. 4*b*-4*c*. When the control handle 402*b* is pulled upward, the control handle pulls the control line 407*b* proximally as well. The handle 401 may include an upper handle half and a lower handle half, the halves coupled via a coupling unit. The coupling unit allows the two handle halves to telescope for adjusting the overall length of the handle 401 and for the two handle halves to rotate relative to each other so that the bend in the handle 401 may be oriented as desired relative to the rake portion. For example, the upper half may be oriented 180 degrees so that the bend is in the opposite direction as that shown in FIG. 4*a*.

A gardener may therefore use the all-in-one yard rake and debris pickup device as a rake when the pair of yard rake tines 405*a*-*b* are located in the rake position. The gardener may unlock the tines 405*a*-*b* relative to the handle coupling device 403, pull up on the control handle 402*b* to place the device 400 in the open grabbing position and then pull up on the control handle 402*a* to grab the raked yard debris for placement into a trash bag, refuse can or wheelbarrow for disposal. Release of the control handles 402*a*-*b* in the reverse sequence returns the yard rake tines 405*a*-*b* to the starting positions.

FIG. 5*a* illustrates the handle coupling device 403 according to one embodiment. The handle coupling device 403 generally includes a head tube 507 that is tubular in shape, as shown. At the distal end, a first and second fork leg 502, 503 extend distally and spaced apart preferably as a mirror image of each other to form a forked shape. Each of the legs 502, 503 preferably includes a first of a set of interlocking engagement elements 408 that interlock with corresponding elements on the attachment devices 404*a*-*b*. The device 403 may include a first pivot point 506 for pivotally supporting the second control handle 402*b* and a cable connector 504 that supports and allows the second line 407*b* to be moved therein by pulling on the respective control handle 402*b*. In a preferred embodiment, the device 400 includes a joint 508 pivotally coupled to the distal end of the legs 502, 503. Preferably, the joint 508 allows for a plurality of axes of pivoting movement. For example, joint 508 may be configured for pivoting about first axis A, which is parallel to the axis or axes (E, D) associated with the support device 406. The device 400 may include a coupling 509 pivotally coupled to the fork legs and the attachment devices. The coupling 509 may be configured for rotation at the fork leg about axis B, which is parallel to the axis or axes (E, D) associated with the support device 406. At the distal end, the coupling 509 may be configured for rotation relative to the attachment device about axis C, which is perpendicular to the axis or axes (E, D) associated with the support device 406. As can be seen, this joint 508 allows for vertical and lateral movement of axis C associated with coupling 509 with the shifting of the axes A and B.

FIG. 5*b* illustrates the attachment devices 404*a-b* according to one embodiment. The attachment devices 404*a-b* is preferably a planer structure with a top surface, shown. The top surface preferably includes a second of the set of interlocking engagement elements 408 and a portion 510 of the hinge at the attachment points 403*a*. That is, the portion that accommodates the distal end of joint 508 and/or coupling 509. As discussed herein, the attachment devices 404*a-b* are hingedly coupled to each other via support device 406, which provides a first axis D and a second axis E for pivoting/folding of attachment devices 404*a-b* relative to each other and to the support device 406, as shown in FIG. 5*f*. The support device 406 preferably includes a slot 513 for attaching the distal end of the control line 407*a* thereto. The attachment devices 404*a-b* preferably include holes 511, 512 for routing the second control line 407*b* therethrough, as will be explained in greater detail below. Referring to FIG. 5*c*, the bottom surface of the attachment devices 404*a-b* preferably includes a flanged structure 514 that form a circular slot to that receives a correspondingly shaped structure on the tines 504*a-b*, as shown in FIGS. 5*d*-5*e*.

FIGS. 5*d*-5*e* illustrates the tines 504*a-b* according to one embodiment. The set of tines 504*a-b* generally include a plurality of tines extending radially outward. As discussed above, the tines 504*a-b* include a circular flange 515 that mates with the flanged structure 514 to provide the rotational movement discussed herein. The tines 504*a-b* further include a slot that receives the distal end of the second control line 407*b*.

FIGS. 5*g-i* illustrates the routing of control lines 407*a-b* according to one embodiment. As can be seen, the first control line 407*a* begins proximally, passes through the handle 401 and continues to the slot 513 in support device 406. The second control line 407*b* begins proximally, except on the opposite side of the handle 401, passes through slot 504 on coupling device 403, then through slots 512 in each of the attachment device 404*a-b*, and finally slot 516 in each of the tines 405*a-b*. Therefore, retracting line 407*b* causes the tines 405*a-b* to pivot about flanges 515 in opposite directions, as shown.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A device comprising:
   an elongated handle having a proximal end and a distal end;
   a fork shaped handle coupling device attached to the distal end of the elongated handle, the coupling device having a tubular head and a first leg and a second leg spaced laterally apart from the first leg, each of the first leg and the second leg extending distally from the tubular head;
   a first planar attachment device pivotally coupled to a distal end of the first leg of the handle coupling device and a second planar attachment device pivotally coupled to a distal end of the second leg the handle coupling device and hingedly coupled to the first planar attachment device, wherein the first and second planar attachment devices are configured for a user to be able to pivot the first and second planar attachment device between a first position wherein the first and second planar attachment device are essentially orthogonal to the elongated handle and at least one other position wherein the first and second planar attachment device are other than orthogonal to the elongated handle; and
   a first set of yard rake tines rotatably coupled to the first planar attachment device so as to rotate in a plane parallel with the first planar attachment device and a second set of yard rake tines rotatably coupled to the second planar attachment device so as to rotate in a plane parallel with the second planar attachment device, wherein the first and second sets of yard rake tines are configured for a user to be able to rotate the first and second yard rake tines together as a set between a first position wherein the first and second yard rake tines both extend distally to perform as a rake and at least one other position wherein the first and second yard rake tines extend outwardly in opposite directions from each other to perform as a grabbing device.

2. The device of claim 1, wherein the first and second sets of yard rake tines rotate between the first position and the at least one other position in essentially the same plane.

3. The device of claim 1, wherein in the at least one other position, the first and second planar attachment devices are in a plane essentially parallel to an axis of the elongated handle.

4. The device of claim 1, wherein the first and second attachment devices have a generally planar structure that are essentially in the same planes as the first and second set of tines.

5. The device of claim 1, comprising a support device pivotally coupled to the first and second planar attachment devices therewith forming a dual axis hinge between the first and second planar attachment devices.

6. The device of claim 5, wherein the axes of the hinge are in a same or a parallel plane as the first and second planar attachment devices, and wherein the axes of the hinge in the first position of the first and second planar attachment device are essentially orthogonal to the elongated handle and in the at least one other position the first and second planar attachment device the axes are other than orthogonal to the elongated handle.

7. The device of claim 5, wherein the first and second planar attachment devices are coupled along their respective proximal edges to the hinged support device.

8. The device of claim 1, comprising interlocking engagement elements for locking the first and second planar attachment device in the first position wherein the tines extend outwardly to perform as a rake.

9. The device of claim 1, comprising a first control handle pivotally coupled to the elongated handle, a first control line having a proximal end coupled to the first control handle and a distal end coupled to at least one of the first and second planar attachment devices, the device configured therewith to cause the first and second planar attachment devices to fold by pulling the first control line via the first control handle.

10. The device of claim 9, comprising a support device with a slot therein pivotally coupled to the first and second planar attachment devices therewith forming a dual axis hinge between the first and second planar attachment devices, the first control line coupled at its distal end to the slot in the support device.

11. The device of claim 9, wherein the first control line passes through a conduit provided by the tubular head.

12. The device of claim 9, comprising a second control handle pivotally coupled to the elongated handle, a second control line having a proximal end coupled to the first control handle and a distal end coupled to at least one of the first and second set of tines, the device configured therewith to cause the at least one of the first and second set of yard rake tines to rotate relative to at least one of the first and second planar attachment devices by pulling the second control line via the second control handle.

13. The device of claim 12, wherein the second control line pass through a plurality of slots in the first and second planar attachment devices.

14. The device of claim 1, wherein at least one of the first and second planar attachment devices comprise a circular flanged structure that forms a circular slot for receiving a correspondingly shaped structure on at least one of the first and second sets of yard rake tines.

15. The device of claim 9, comprising a second control handle pivotally coupled to the elongated handle, a second control line having a proximal end coupled to the first control handle and a distal end coupled to at least one of the first and second set of tines, the device configured therewith to cause the at least one of the first and second set of yard rake tines to rotate relative to at least one of the first and second planar attachment devices by pulling the second control line via the second control handle.

16. The device of claim 15, wherein the second control line pass through a plurality of slots in the first and second planar attachment devices.

* * * * *